(No Model.)

T. J. KERNS.
VESSEL FOR COOLING LIQUIDS.

No. 437,999. Patented Oct. 7, 1890.

WITNESSES.
J. A. Rutherford
Robert Everett

INVENTOR.
Thomas J. Kerns.
By James L. Norris
Atty.

UNITED STATES PATENT OFFICE.

THOMAS J. KERNS, OF NORTH ADAMS, MASSACHUSETTS, ASSIGNOR TO PETER SNYDER AND FRANKLIN A. BROOKS, BOTH OF SAME PLACE.

VESSEL FOR COOLING LIQUID.

SPECIFICATION forming part of Letters Patent No. 437,999, dated October 7, 1890.

Application filed July 7, 1890. Serial No. 357,947. (No model.)

*To all whom it may concern:*

Be it known that I, THOMAS J. KERNS, a citizen of the United States, residing at North Adams, in the county of Berkshire and State of Massachusetts, have invented new and useful Improvements in Vessels for Cooling Liquids, of which the following is a specification.

My invention relates to devices for cooling milk, ale, beer, and other liquors, and the purpose thereof is to provide a simple and inexpensive device, which may be brought within the reach of every person, whereby a considerable body of liquid may be cooled at a small expense for ice. It is my purpose, also, to provide a cooling vessel or receptacle having a central chamber of suitable form in which ice may be stored and wholly inclosed, means being provided whereby the said vessel may be partly or wholly inverted without displacing the ice-containing vessel and without losing the ice placed therein.

The invention consists to these ends in the several novel features of construction and new combinations of parts, hereinafter fully set forth, and then definitely pointed out in the claims which follow this specification.

To enable others to practice my invention, I will describe the same in detail, reference being had to the accompanying drawings, in which—

Figure 1:
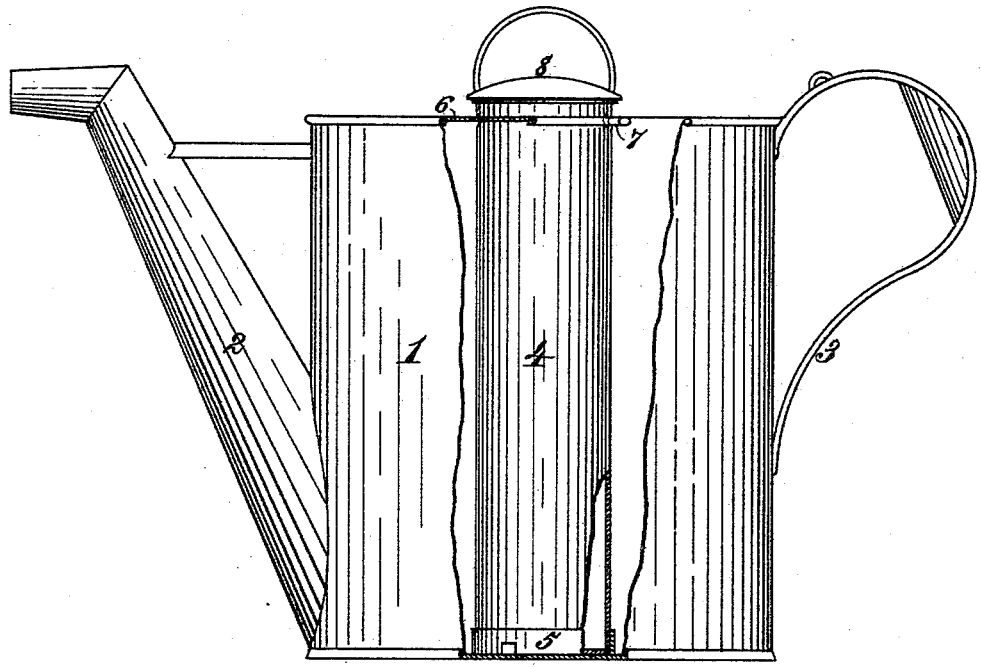
Figure 2:
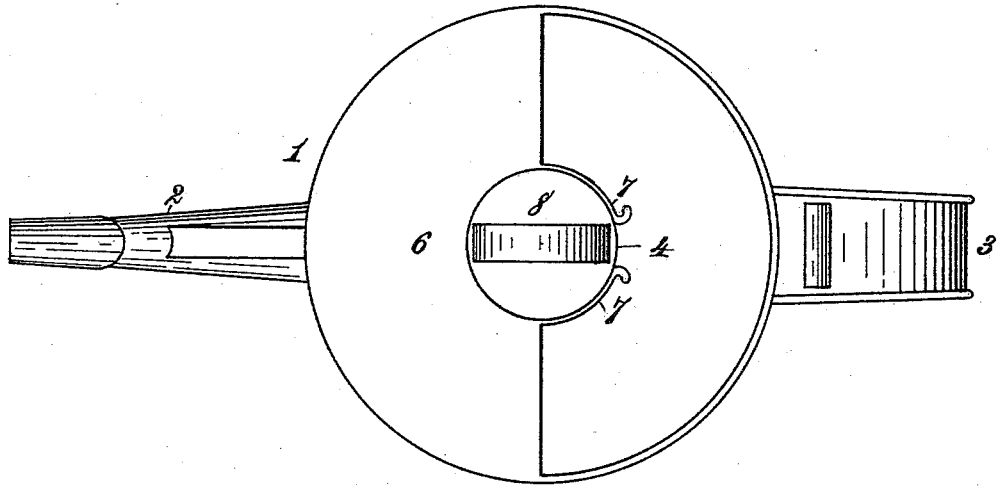

Figure 1 is a side elevation, partly broken away to show the interior construction. Fig. 2 is a plan view of the device shown in Fig. 1.

In the said drawings, the reference-numeral 1 denotes the body of a can or other vessel of any suitable size and shape, by which it is adapted to contain such liquids as beer and milk in any required quantity. While this vessel may be constructed in any desired manner, I have shown it in the drawings provided with a spout 2 and a handle 3 to facilitate the removal of the cooled liquid contained therein. The body of the vessel is shown as cylindrical, but it may be of any other form preferred.

Centrally arranged, or substantially so, within the vessel or can 1 is a cylindrical container 4, of any suitable diameter and having a height somewhat greater than the height of the can. This container is readily removable from the can or vessel, and when inserted therein its lower end is inserted in a ring or annulus 5, attached to the bottom of the said can. At its top the can is provided with a semicircular or half-top 6, having a concentric semicircular opening adapted to receive the upper end of the container, which projects somewhat above the half-top. Upon the under surface of the latter I attach two curved elastic wires or clips 7, curved in the line of the circumference of the container and adapted to embrace the latter upon the side opposite to the half-round opening in which the top of the container lies. A groove or channel may, and preferably is, made in the container to receive said clips, and thereby prevent the container from falling out should the vessel 1 be inverted to such an angle as to permit its displacement by gravity. This groove may be extended entirely around the top of the container to enable the edge of the half-round opening in the top 6 to engage therewith also. I may, however, substitute for this groove a simple flange or outwardly-projecting collar adapted to lie beneath the clips 7 or to engage the same, together with the edge of the half-round opening in which the top of the container lies.

The container is provided with a cover 8 of any suitable form, and is filled with broken ice. The liquor or liquid to be cooled is placed in the vessel 1, and the ice-filled container is maintained in, or substantially in, the center of this fluid by the supporting-ring or annulus 5 below and the half-top 6 and clips 7 above. It will be seen that by simply separating these clips the ice-container may be readily withdrawn at any moment. Being wholly inclosed within the fluid to be cooled, the loss of refrigeration is very small, while the central and submerged position of the container enables it to perform its functions with great economy. The ready removal and replacement of the container also, together with the simplicity and comparatively inexpensive character of the device, render it especially applicable to all classes of use and bring the invention within the reach of all classes of persons.

What I claim is—

1. In a cooling-vessel, the combination, with an outer receptacle, of a central or substantially central, container adapted to receive ice, said receptacle being provided with a collar or flange on its bottom to receive the lower end of the container, and having also a semicircular top provided with a half-round opening to receive the upper end of the container, and clips which embrace the portion not lying in said half-round opening, substantially as described.

2. In a cooling-vessel, the combination, with a receptacle having a central flange arising from the bottom of said receptacle, of a central container having its lower end lying within said flange and its upper end lying in a half-round opening in a semicircular top on said receptacle, said top being provided with spring-clips which lie in a groove in the container, substantially as described.

In testimony whereof I have affixed my signature in presence of two witnesses.

THOMAS J. KERNS.

Witnesses:
FRED F. DAUDIN,
FRANKLIN A. BROOKS.